March 28, 1967 A. W. CAYER 3,311,273
MEASURING AND DISPENSING DEVICE
Filed June 3, 1965 2 Sheets-Sheet 1

INVENTOR.
Arthur W. Cayer
BY Harold E. Cole
Attorney

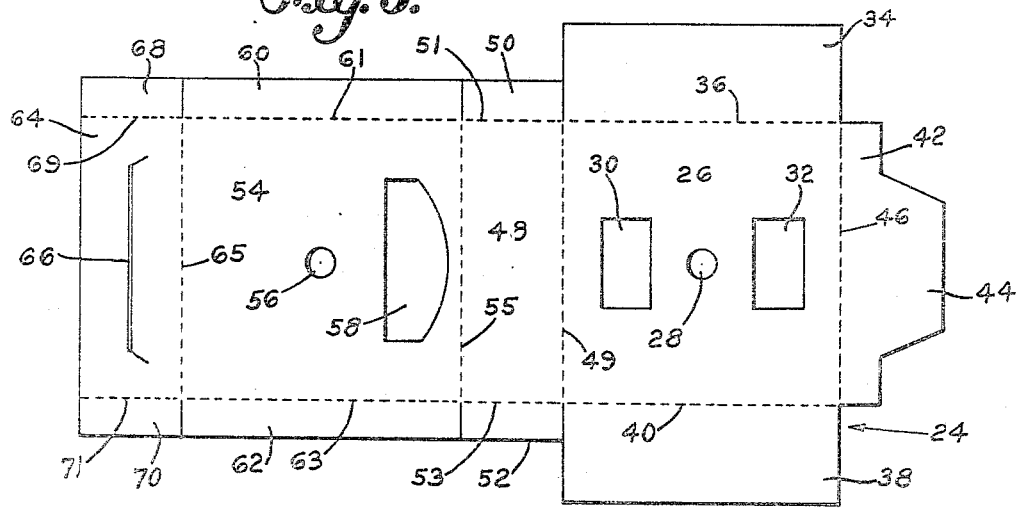
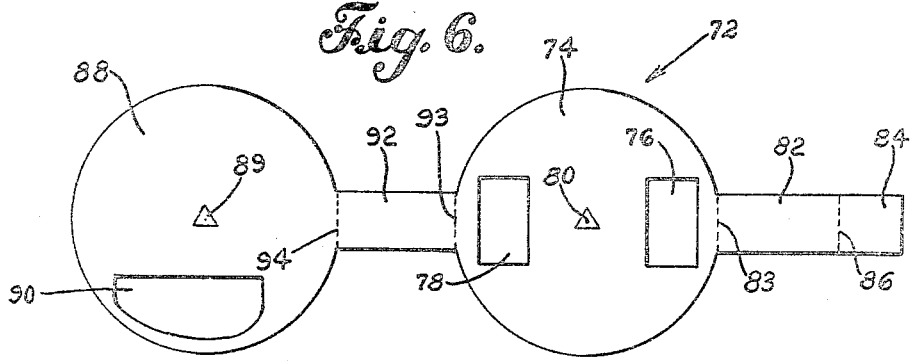
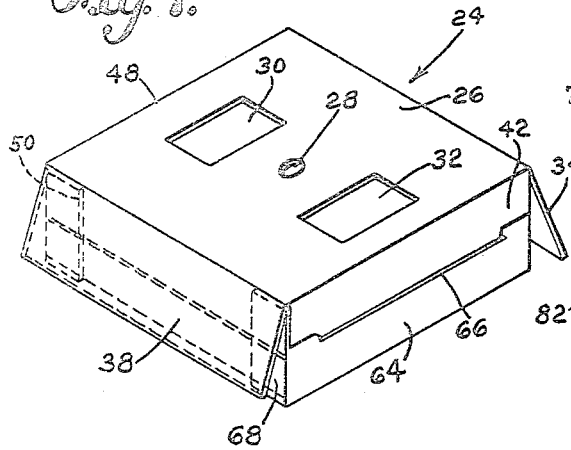
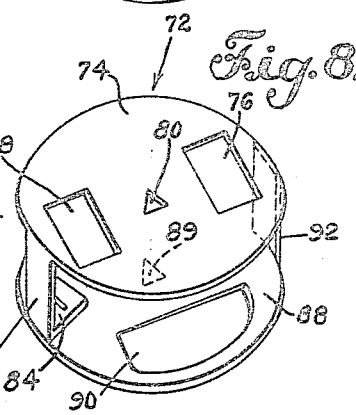

3,311,273
MEASURING AND DISPENSING DEVICE
Arthur W. Cayer, 23½ Jackson St.,
Taunton, Mass. 02780
Filed June 3, 1965, Ser. No. 460,924
14 Claims. (Cl. 222—362)

This invention relates to a device to measure and dispense material, such as detergent, food or other material.

One object of my invention is to provide a measuring and dispensing device which has a simple and compact valve member that cooperates with a receiver whereby a predetermined amount of material is received where it is ready to be disposed as desired.

Another object is to provide a simple and compact receiver that houses said valve member and provides a receptacle to retain the material received until said valve member is opened.

A further object is to so form said valve member and said receiver member that each is formed from a single piece of material by a simple process such as by a die.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings, nor to the particular parts described in the specification; but am entitled to all such changes therefrom as fall within the scope of my claims.

In the drawings:

FIG. 5 is a plan view on a reduced scale, of my receiver before assembling it for use.

FIG. 6 is a plan view, on a reduced scale, of my valve before assembling it for use.

FIG. 7 is a perspective view on a reduced scale of said receiver assembled.

FIG. 8 is a perspective view on a reduced scale of said valve assembled.

Figure 1:
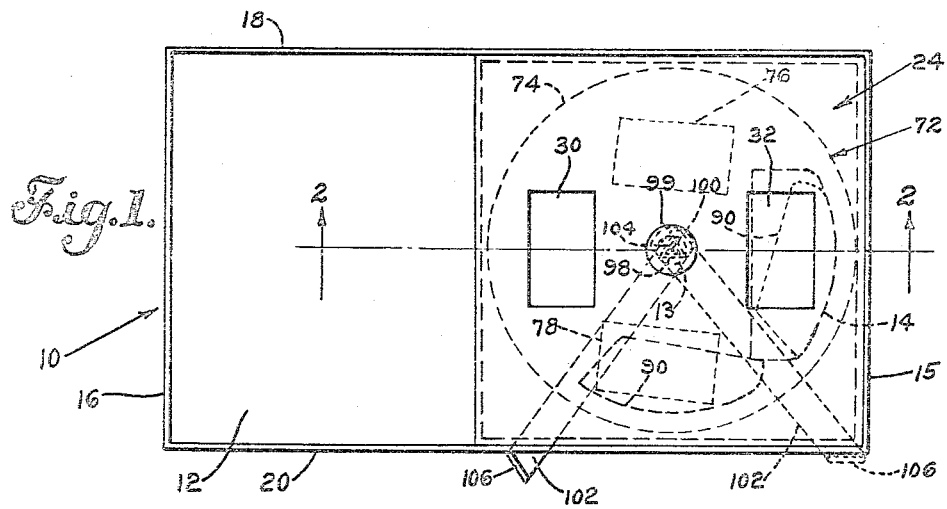
FIG. 1 is a top plan view of my measuring and dispensing device in combination with a container that holds a supply of the material to be dispensed, the actuating lever and valve being shown by dash lines in both closed and open positions.

As illustrated, my measuring and dispensing device is used with a container 10, such as commonly is used to hold detergent or other material. It is shown open at the top. This container has a bottom 12 having a hole 13 to receive a shaft 98 later described. It also has a discharge hole 14 through which the material to be dispensed passes to the outside. As shown it has two narrower sides 15 and 16, and also two wider sides 18 and 20.

A receiver 24 is used in said container 10, being positioned at the bottom at a narrower side thereof. Its size may vary; but commonly it may hold ½ cup of detergent. It is preferably made integral of a single sheet of material such as cardboard. It has a top 26 having a small, round hole 28 to receive said shaft 98. It also has an entrance hole 30 through which material from the container may pass, and as shown I provide another entrance hole 32 spaced from and opposite said hole 30 to facilitate the movement of material from the container 10.

A side 34 extends laterally from said top 26, being defined by a score 36 to facilitate bending when said receiver 24 is being made ready for use. Another side 38 extends laterally from said top 26 being defined by a score 40. A third side 42 has a joining member or closure tongue 44 at its outside end and is defined by a score 46. A connector side 48 extends from said top 26 being defined by a score 49, and it has a short retaining side 50 defined by a score 51. At the opposite side is a similar retaining side 52 being defined by a score 53. Said sides 50 and 52 are narrower than the adjoining portions of said sides 34 and 38.

Said receiver has a bottom 54 that extends laterally from said connector side 48, being defined therefrom by a score 55. This bottom 54 has a round hole 56 for said shaft 98 and it also has a discharge hole 58 that alines with said container hole 14 as shown in said FIG. 1, and through the latter the material passes to the user. At one side of said bottom 54 is a relatively narrow retainer side 60 being defined by a score 61. At an opposite side of bottom 54 is another relatively narrow side 62 that is defined by a score 63. Another side 64 extends from said bottom 54 and is defined by a score 65, and the latter preferably has a slit 66 to receive said tongue 44. Said side 64 includes a retainer side 68 that is defined by a score 69 and also a retainer side 70 that is defined by a score 71. Said sides 34, 38, 42 and 48 are bent along their scores to an angular position relative to said bottom 26 when assembling said receiver, as shown in said FIG. 7.

A movable dispensing valve 72 is housed in said receiver 24 when assembled for use. It is also preferably made integral of a single sheet of material such as cardboard. This valve has a circular top 74 as shown in which there is a material receiving hole 76, and another hole 78 is included when said receiver has two holes such as 30 and 32. These valve holes 76 and 78 are positioned to aline with said receiver holes 30 and 32 when said dispensing valve 72 is moved to receiving position. A triangular shaft hole 80 is also provided in said valve 72. Extending from said top 74 is a spacer 82 defined by a score 83, and which has an attaching tab 84, defined by a score 86. Said tab 84 is adapted to be cemented or stapled to a bottom 88 later described, as shown in FIG. 8.

A circular bottom 88 for said valve 72 has a triangular hole 89 to receive said shaft 98 and it also has a discharge hole 90 normally out of alinement with said receiver discharge hole 58; but that alines with the latter hole 58 when said valve is moved to discharge position, to thus discharge material within said valve and receiver through the container hole 14. Another spacer 92 is defined by a score 93 from said top 74 and by a score 94 from said bottom 88.

A shaft 98, that is triangular in cross section and has a knob 99, extends through said holes 28, 80, 89, 56 and 13. Since said valve holes 80 and 89 are triangularly shaped said shaft rotates said valve 72 when it is rotated; but does not rotate said receiver 24 or move the container 10.

At one outside end of said shaft a hole 100 is provided to make a connection with a lever 102 that has an attaching knob 104 at one end that enters said hole 100 and thereby makes a press-fitted connection with said lever. At the outside end of said shaft is an angular stop 106 that contacts, and is stopped at, a corner of said container 10 when said valve 72 and lever 102 reach the limit of their opening movement. As shown at the left in said FIG. 1, said valve 72 and lever 102 are in closed or non-discharge position, while at the right they are shown in open or discharge position with said valve opening 90 in alinement with said container opening 14, and receiver opening 58.

Said valve 72 is assembled by attaching said tab 84 to said bottom 88 which spaces the latter from said valve top 74. Said valve 72 is placed between said receiver bottom 54 and top 26 and the receiver is assembled as shown in said FIG. 7 with its top 26, bottom 54 and said sides 34, 38, 42 and 48 at the outside, and with said tongue 44, extending into said slit 66. This assembly is placed within said container 10, resting on the bottom, and fitting snugly between said sides 18 and 20. If desired, said adjoining sides 34 and 60 may previously be cemented together, and likewise said sides 38 and 62.

When the valve 72 is assembled in the receiver 24, and the latter is within said container 10, said valve openings 76 and 78 will normally register with said receiver openings 30 and 32, and material in the container will pass through said latter openings into the interior of said valve 72 and receiver 24. Then said receiver discharge opening 58 alines with said container opening 14, the latter preferably having greater area than said discharge opening 58 to facilitate passage of the material out of the container 10. Also said valve discharge opening 90 is out of alinement with said receiver discharge opening 58 at this time.

Figure 2:
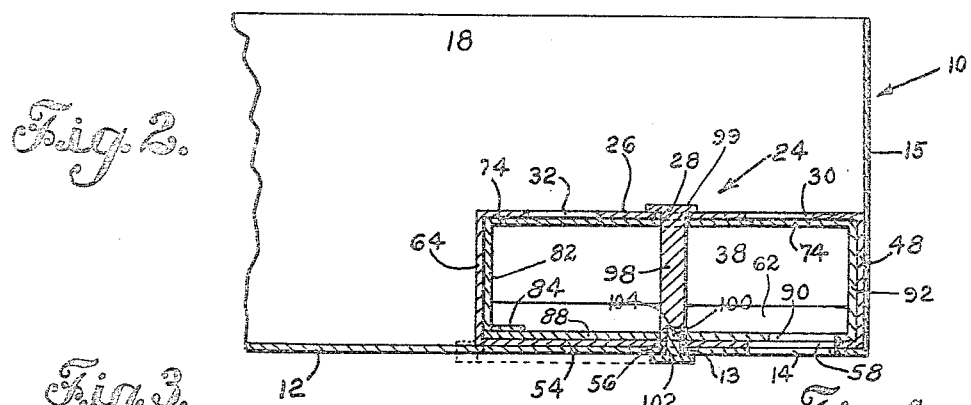
FIG. 2 is a sectional view taken on the line 2—2 of FIG. 1.
Figure 3:
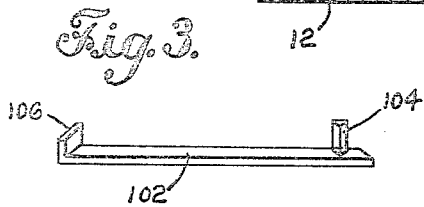
FIG. 3 is a perspective view of the actuating lever.
Figure 4:
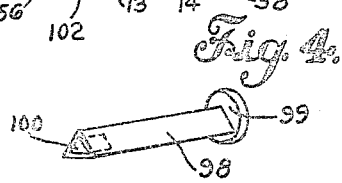
FIG. 4 is a perspective view of a shaft to which the lever is attached.

Upon movement of said lever 102, said valve is rotated until discharge opening 90 alines with said openings 58 and 14, which permits a measured quantity of material to flow out of the container. Also said receiver openings 76 and 78 in said valve have simultaneously been moved out of alinement with said receiver openings 30 and 32, hence material in said container cannot flow through them. This discharge position is illustrated in said FIG. 2.

What I claim is:

1. A measuring and dispensing device in combination with a container having a discharge hole at the bottom, said device comprising a receiver positioned at one side of said container and spaced from the side opposite thereto and having a bottom, a top spaced therefrom and four sides integral with said top and extending angularly to said top and bottom, one of said sides being integral with and connecting said top and bottom, said receiver top having an entrance hole and said receiver bottom having a discharge hole in alinement with said container discharge hole, a valve in, and movable relative to said receiver, said value having a top, a bottom and spacer means extending between said latter top and bottom, said valve top having an entrance hole normally alined with said receiver top entrance hole to receive material therethrough and adapted to be moved out of alinement therewith, said valve bottom having a discharge hole normally out of alinement with said receiver bottom discharge hole and adapted to be moved into alinement therewith, and actuating means extending outside of said container attached to said valve and adapted upon actuation to move said valve into discharge position or non-discharge position.

2. A measuring and dispensing device in combination with a container as set forth in claim 1, said actuating means embodying a shaft extending through said receiver, valve and container, and attached to said valve.

3. A measuring and dispensing device in combination with a container as set forth in claim 2, and a lever attached to said shaft and outside of said container.

4. A measuring and dispensing device in combination with a container as set forth in claim 3, said container being rectangular in cross section, said lever having a stop member at an outside end thereof and being so positioned and of such length that when said lever has moved to fully open position said stop member contacts said container adjacent a corner thereof.

5. A receiver blank for a measuring and dispensing device of a single piece of material comprising a top, having a receiver hole therethrough, four sides extending angularly from said top and angularly relative to each other, and a bottom having a discharge hole therethrough, one of said sides extending between and connecting said top and bottom.

6. A receiver blank for a measuring and dispensing device as set forth in claim 5, said connecting side having two retaining sides respectively at opposite sides thereof.

7. A receiver blank for a measuring and dispensing device as set forth in claim 6, said bottom embodying two retaining sides at opposite sides thereof adjoining said retaining sides of said connecting side.

8. A receiver blank for a measuring and dispensing device as set forth in claim 5, and a side adjoining said bottom at the outside end of the latter.

9. A valve balnk for a measuring and dispensing device of a single piece of material comprising a top having a receiving hole therethrough, a bottom spaced therefrom having a discharge hole therethrough in non-alinement with said receiving hole, and a spacer between and connecting said top and bottom.

10. A valve blank for a measuring and dispensing device of a single piece of material as set forth in claim 9, and another spacer oppositely disposed to said first spacer and extending from said top.

11. A valve blank for a measuring and dispensing device of a single piece of material as set forth in claim 10, said other spacer being longer than said first spacer and having an attaching tab portion at the outside end thereof.

12. A measuring and dispensing device comprising a receiver having a bottom, a top spaced therefrom and four sides extending angularly to said top and bottom, one of said sides being attached to and connecting said top and bottom, said receiver top having an entrance hole and said receiver bottom having a discharge hole, a valve in, and movable relative to, said receiver, said valve having a top, a bottom and spacer means extending between said latter top and bottom, said valve top having an entrance hole normally alined with said receiver top entrance hole to receive material therethrough and adapted to be moved out of alinement therewith, said valve bottom having a discharge hole normally out of alinement with said receiver bottom discharge hole and adapted to be moved into alinement therewith, and a side extending from and angularly to said receiver bottom having a slit therein, one of said four sides extending from said receiver top and embodying a connector adapted to enter said slit and thereby connect with said receiver bottom side.

13. A measuring and dispensing device comprising a receiver having a bottom, a top spaced therefrom and four sides extending angularly to said top and bottom, one of said sides being attached to and connecting said top and bottom, said receiver top having an entrance hole and said receiver bottom having a discharge hole, a valve in, and movable relative to, said receiver, said valve having a top, a bottom and spacer means extending between said latter top and bottom, said valve top having an entrance hole normally alined with said receiver top entrance hole to receive material therethrough and adapted to be moved out of alinement therewith, said valve bottom having a discharge hole normally out of alinement with said receiver bottom discharge hole and adapted to be moved into alinement therewith, said receiver connecting side embodying two retaining sides at opposite sides thereof extending angularly to adjoining portions of said receiver connecting side and being narrower than said receiver first sides.

14. A measuring and dispensing device comprising a receiver having a bottom, a top spaced therefrom and four sides extending angularly to said top and bottom, one of said sides being attached to and connecting said top and bottom, said receiver top having an entrance hole and said receiver bottom having a discharge hole, a valve in, and movable relative to, said receiver, said valve having a top, a bottom and spacer means extending between said latter top and bottom, said valve top having an entrance hole normally alined with said receiver top entrance hole to receive material therethrough and adapted to be moved out of alinement therewith, said valve bottom having a discharge hole normally out of alinement with said receiver bottom discharge hole and adapted to be moved into alinement therewith, said receiver bottom embodying two retaining sides at opposite sides thereof extending angularly to adjoining portions of said receiver bottom and being narrower than said receiver connecting side.

References Cited by the Examiner
UNITED STATES PATENTS

| 1,083,515 | 1/1914 | Amsler | 222—362 X |
| 2,390,448 | 12/1945 | Moeller | 222—370 |
| 2,761,592 | 9/1956 | Lewis et al. | 222—370 X |

ROBERT B. REEVES, *Primary Examiner.*

HADD S. LANE, *Examiner.*